United States Patent

Araki et al.

[11] Patent Number: 6,110,235
[45] Date of Patent: Aug. 29, 2000

[54] FABRICATION METHOD OF SOLID ELECTROLYTIC CAPACITOR USING ORGANIC CONDUCTING POLYMER

[75] Inventors: Kenji Araki; Satoshi Arai; Yuuji Aoki; Kenichi Takahashi; Takashi Fukaumi, all of Toyama, Japan

[73] Assignee: NEC Corporation, Tokyo, Japan

[21] Appl. No.: 09/144,253

[22] Filed: Aug. 31, 1998

[30] Foreign Application Priority Data

Sep. 1, 1997 [JP] Japan .................................. 9-236051

[51] Int. Cl.$^7$ .............................. B21F 41/00; H01G 9/00; H01G 9/02
[52] U.S. Cl. .......................... 29/25.03; 361/523; 361/525
[58] Field of Search ........................ 29/25.03; 361/523, 361/525

[56] References Cited

U.S. PATENT DOCUMENTS

| 4,785,380 | 11/1988 | Harakawa et al. | 361/433 |
| 5,117,332 | 5/1992 | Kudoh et al. | 361/525 |
| 5,189,770 | 3/1993 | Waidhas et al. | 29/25.03 |
| 5,580,358 | 12/1996 | Narusawa et al. | 29/25.03 |

FOREIGN PATENT DOCUMENTS 8-64476  8/1996  Japan .

Primary Examiner—John F. Niebling
Assistant Examiner—Ha Tran Nguyen
Attorney, Agent, or Firm—Sughrue, Mion, Zinn, Macpeak & Seas, PLLC

[57] ABSTRACT

A fabrication method of a solid electrolytic capacitor is provided, which decreases the leakage current of a solid electrolytic capacitor without deterioration of ESR. This method is comprised of the steps (a) to (e). In the step (a), a capacitor body is formed by a valve metal, the body serving as an anode of the capacitor. In the step (b), an oxide layer of the valve metal is formed to cover a surface of the capacitor body by anodic oxidation, the oxide layer serving as a dielectric of the capacitor. In the step (c), a layer of an organic conducting polymer is formed on the oxide layer, the layer of the organic conducting polymer serving as a solid electrolyte of the capacitor. In the step (d), the capacitor body with the oxide layer and the layer of the organic conducting polymer is immersed in a reoxidation solution, the reoxidation solution containing a mixture of water and alcohol or a mixture of water and ketone as a solvent. In the step (e), a voltage is applied to the capacitor body to reoxidize the oxide layer in the reoxidation solution by anodic oxidation, thereby healing defects of the oxide layer. The amount of alcohol or ketone is preferably 30 vol % to 50 vol %.

7 Claims, 4 Drawing Sheets

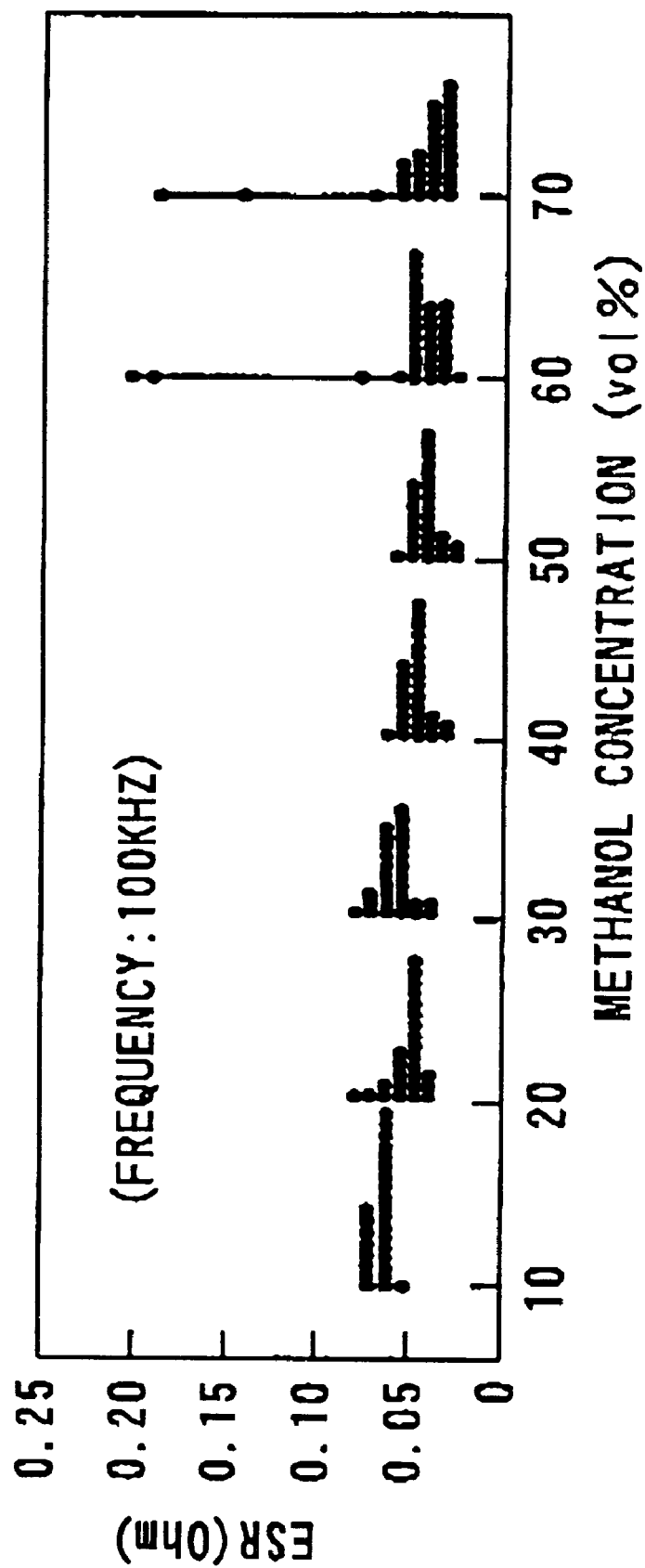

FABRICATION METHOD OF SOLID ELECTROLYTIC CAPACITOR USING ORGANIC CONDUCTING POLYMER

BACKGROUND OF THE INVENTION

1. Field of the Invention

The present invention relates to a fabrication method of a solid electrolytic capacitor and more particularly, to a fabrication method of a solid electrolytic capacitor using an organic conducting polymer (for example, polypyrrole, polythiophene, polyaniline, or polyfuran) as a solid electrolyte of the capacitor, which decreases the leakage current.

2. Description of the Prior Art

In recent years, electronic components have been becoming miniaturized more and more and their operation speed and operation frequency have been becoming higher and higher. Also, digitalization has been progressing rapidly in signal processing. To cope with the tendency, there has been the strong need of decreasing the impedance of capacitors in high-frequency regions.

Typically, a solid electrolytic capacitor has a porous capacitor body or pellet serving as an anode, which is typically made by sintering a powder of a valve metal such as tantalum (Ta) and aluminum (Al). An oxide layer of the valve metal, which serves as a dielectric, is formed on the expanded surface of the porous capacitor body. A solid electrolyte layer serving as a cathode is formed on the oxide layer. An anode lead is fixed to the capacitor body to be electrically connected to the same through an anode wire. An electrically-conductive layer is formed on the solid electrolyte layer. A cathode lead is fixed to the solid electrolyte layer to be electrically connected to the same through the electrically-conductive layer.

The porous capacitor body, the oxide layer, the solid electrolyte layer, the electrically-conductive layer, the anode wire, the anode lead, and the cathode lead are encapsulated by a synthetic-resin package in such a way that an outer part of the anode lead and an outer part of the cathode lead protrude from the package.

The solid electrolyte layer has a function of electrically interconnecting the cathode lead with the entire surface of the dielectric (i.e., the oxide layer) formed on the capacitor body. Therefore, from this viewpoint, it is desirable that the solid electrolyte layer is a substance having a high electrical conductivity. On the other hand, the solid electrolyte layer needs to have a healing function of healing an electrical short-circuit due to defects in the dielectric.

Accordingly, a metal, which has a high electrical conductivity, but has no dielectric healing function, cannot be used as the solid electrolyte layer. As a result, conventionally, manganese dioxide ($MnO_2$) or lead dioxide ($PbO_2$) has been popularly used as the solid electrolyte layer, because $MnO_2$ and $PbO_2$ have a property that they are transformed from an electrical conductor into an electrical insulator due to the heat generated by a short-circuit current caused by the defects in the dielectric.

However, $MnO_2$ and $PbO_2$ have a problem of a comparatively low electrical conductivity of approximately 0.1 S/cm, resulting in a high Equivalent Series Resistance (ESR) in high-frequency regions.

To solve this problem of the high ESR, recently, various capacitors using one of conducting polymers such as polypyrrole as the solid electrolyte layer have been vigorously developed. This is because these conducting polymers have an electrical conductivity as high as 10 to 100 S/cm.

It has been known that these conducting polymer layers can be formed on the oxide layer with the use of an "electrolytic polymerization" or "chemically-oxidative polymerization" process.

On the other hand, however, the conventional capacitors using one of the conducting polymers have a problem of a high leakage current compared with the popular capacitors using $MnO_2$ or $PbO_2$ as the solid electrolyte layer. To solve this problem, an improved fabrication method was developed, in which the oxide layer serving as the dielectric is subjected to "anodic reoxidation" (which maybe termed "reformation") using an organic electrolyte solution prepared by adding a small amount of phosphoric acid to methanol after the solid electrolyte layer is formed by one of the conducting polymer layers. This method is disclosed in the Japanese Non-Examined patent publication No. 8-64476 published in March 1996.

With the improved fabrication method of a solid electrolyte capacitor disclosed in the Japanese Non-Examined patent publication No. 8-64476, however, there is a problem that a leakage current of the oxide layer serving as the dielectric is yet high and the oxide layer tends to be decomposed by the large leakage current. This degrades the ESR characteristic of the capacitor.

SUMMARY OF THE INVENTION

Accordingly, an object of the present invention to provide a fabrication method of a solid electrolytic capacitor that decreases the leakage current of a solid electrolytic capacitor.

Another object of the present invention is to provide a fabrication method of a solid electrolytic capacitor that improves healing behavior of an oxide layer serving as a dielectric in an anodic reoxidation process.

Still another object of the present invention is to provide a fabrication method of a solid electrolytic capacitor that suppress decomposition of a layer of an organic conducting polymer serving as a cathode in an anodic reoxidation process.

The above objects together with others not specifically mentioned will become clear to those skilled in the art from the following description.

A fabrication method of a solid electrolytic capacitor according to the present invention is comprised of the following steps (a) to (e):

In the step (a), a capacitor body is formed by a valve metal. The body serves as an anode of the capacitor.

In the step (b), an oxide layer of the valve metal is formed to cover a surface of the capacitor body by anodic oxidation. The oxide layer serves as a dielectric of the capacitor.

In the step (c), a layer of an organic conducting polymer is formed on the oxide layer. The layer of the organic conducting polymer serves as a solid electrolyte of the capacitor.

In the step (d), the capacitor body with the oxide layer and the layer of the organic conducting polymer is immersed in a reoxidation solution. The reoxidation solution contains a mixture of water and alcohol or a mixture of water and ketone as a solvent.

In the step (e), a voltage is applied to the capacitor body to reoxidize the oxide layer in the reoxidation solution by anodic oxidation, thereby healing defects of the oxide layer.

With the fabrication method of an electrolytic capacitor according to the present invention, alcohol or ketone contained in the reoxidation solution has a function of raising the affinity of the solute of the reoxidation solution to the layer of the organic conducting polymer. On the other hand, it is usual that the surface of the oxide layer is porous and the layer of the organic conducting polymer also is porous.

Therefore, due to the above affinity-raising function, the reoxidation reaction of the oxide layer is accelerated because of improved penetration of the solute into the pores of the oxide layer and the pores of the layer of the organic conducting polymer. As a result, the defects of the oxide layer are effectively healed, thereby decreasing the leakage current of the oxide layer.

Moreover, the water contained in the reoxidation solution has a function of forming an electric potential barrier against injected electrons to thereby suppress the leakage current of the oxide layer during the step (e).

Consequently, the layer of the organic conducting polymer is prevented from being decomposed, which decreases the leakage current of the capacitor and improves the ESR characteristic thereof.

DETAILED DESCRIPTION OF THE INVENTION

The inventors of the present invention made a thorough effort to solve the previously-described problem of the fabrication method of a solid electrolyte capacitor disclosed in the Japanese Non-Examined patent publication No. 8-64476.

As a result of this, they have found that the previously-described problem of a high leakage current of the oxide layer is caused by the fact that (i) the number of hydroxide $(OH^{31})$ ions existing in the electrolyte solution used in the anodic reoxidation process (i.e., the reoxidation solution) is very small and that (ii) the affinity of phosphoric acid to the layer of the organic conducting polymer is low.

Due to the insufficient or poor hydroxide ions, the progress of healing of the oxide layer tends to be delayed during the anodic reoxidation process. In this case, a large current tends to flow to the layer of the organic conducting polymer during this process, especially, at the start of this process. This large current induces decomposition of the dielectric layer, thereby degrading the ESR characteristic.

Moreover, they found that when a mixture of water and alcohol or a mixture of water and ketone is used as the solvent of the reoxidation solution, alcohol or ketone contained in this solution improves or raises the affinity of the solute of this solution to the layer of the organic conducting polymer.

The present invention comprising the above steps (a) to (e) was created based on the knowledge thus found.

In the method of the present invention, it is supposed that "water" in the reoxidation solution has the following function.

Specifically, the organic conducting polymer has a function of pulling the electrons from the oxide layer and as a result, some regions where the electrons are insufficient or poor are formed. In other words, "electron-poor regions" are formed in the oxide layer due to the organic conducting polymer. Therefore, when a positive bias voltage is applied to the capacitor body, the electric potential barrier against the injected electrons becomes lower than the case where the layer of the organic conducting polymer is not formed.

The water in the reoxidation solution, which is absorbed into the oxide layer, dissociates into hydrogen ions ($H^+$) and hydroxide ions ($OH^-$) by the applied voltage in the step (e). The hydroxide ions existing on the surface of the oxide layer form an electric potential against the injected electrons or raises the electric potential against the injected electrons. Accordingly, these hydroxide ions enhance the reoxidation effect and at the same time, they prevents a large current from flowing to the layer of the organic conducting polymer during the reoxidation process, thereby preventing the organic conducting polymer from decomposing. This prevention of decomposition of the organic conducting polymer suppresses the degradation of the ESR.

Since the leakage current of the oxide layer is suppressed during the reoxidation process, the voltage and time period of the reoxidation process can be set as higher and longer values, respectively. Therefore, the dielectric strength, the aging failure-rate, and the leakage-current-induced defects of the solid electrolyte capacitor can be drastically improved.

Additionally, the healing behavior of the oxide layer is due to the function of the solute of the reoxidation solution.

As the solute of the reoxidation solution, one of phosphoric acid, adipic acid, boric acid, acetic acid, and their salts may be preferably used. This is because the advantages of the present invention are effectively obtained. The solute of the reoxidation solution serves to enhance the electrical conductivity of the reoxidation solution.

Any salts of phosphoric acid, adipic acid, boric acid, and acetic acid are may be used as the solute of the reoxidation solution. For example, sodium dihydrogen phosphate, sodium acetate, ammonium adipate, or sodium tetraborate decahydrate may be preferably used, because these salts are popularly used and readily accessible.

In the method according to the present invention, any alcohol or any ketone may be used. However, it is preferred that methanol, ethanol, butanol, or ethylene glycol is used as the alcohol, and that dimethylketone or diethylketone is used as the ketone. This is because the advantages of the present invention are effectively obtained.

The amount of the alcohol or ketone is preferably in a range from 30 vol % to 50 vol %. If the concentration of alcohol or ketone is greater than 50 vol %, the number of the hydroxide ions ($OH^-$) existing on the surface of the oxide layer becomes low and therefore, the obtainable reoxidation effect becomes insufficient. On the other hand, if the concentration of alcohol or ketone is less than 30 vol %, the obtainable reoxidation effect becomes insufficient.

As the water, popular pure water (molecular weight is 18) that have been used in the semiconductor device fields is preferably used.

As the conducting polymer, any one of the conducting polymers may be used. However, it is preferred that polypyrrole, polythiophene, polyaniline or polyfuran is used, because the advantages of the present invention are effectively obtained.

As the valve metal, tantalum (Ta), aluminum (Al), niobium (Nb), titanium (Ti), zirconium (Zr), magnesium (Mg), silicon (Si), or the like may be used.

The capacitor body is typically in the form of a porous pellet. However, it may be any other form. For example, the capacitor body is formed by a rolled foil, a sintered powder, or an etched, rolled foil.

BRIEF DESCRIPTION OF THE DRAWINGS

In order that the present invention may be readily carried into effect, it will now be described with reference to the accompanying drawings.

FIG. 3 is a graph showing the distribution of the ESR of the capacitor fabricated by the method of the present invention with respect to the methanol concentration during the reoxidation process according to the examples of the present invention.

EXAMPLES

Preferred examples of the present invention will be described below with reference to FIGS. 1A to 1D, 2, and 3.

First Example

Figure 1A:
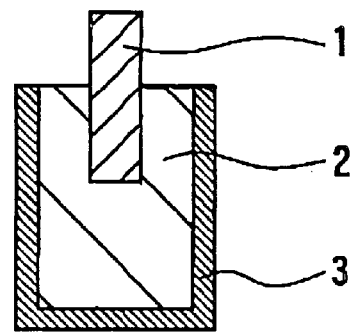
FIGS. 1A to 1D are schematic cross-sectional views showing the process steps of a first example of a fabrication method of a solid electrolytic capacitor according to examples of the present invention, respectively.
Figure 1B:
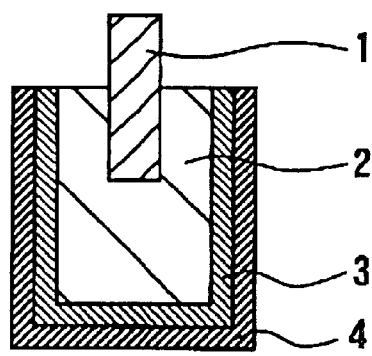
Figure 1C:
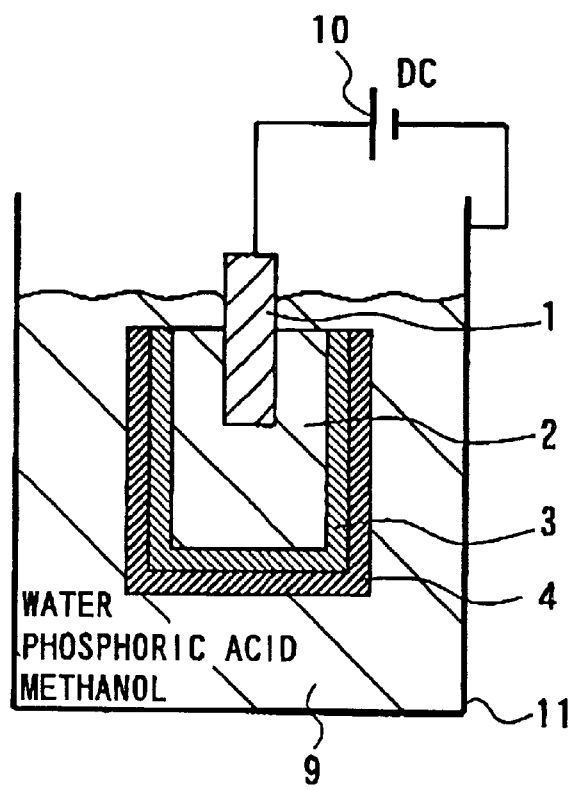
Figure 1D:
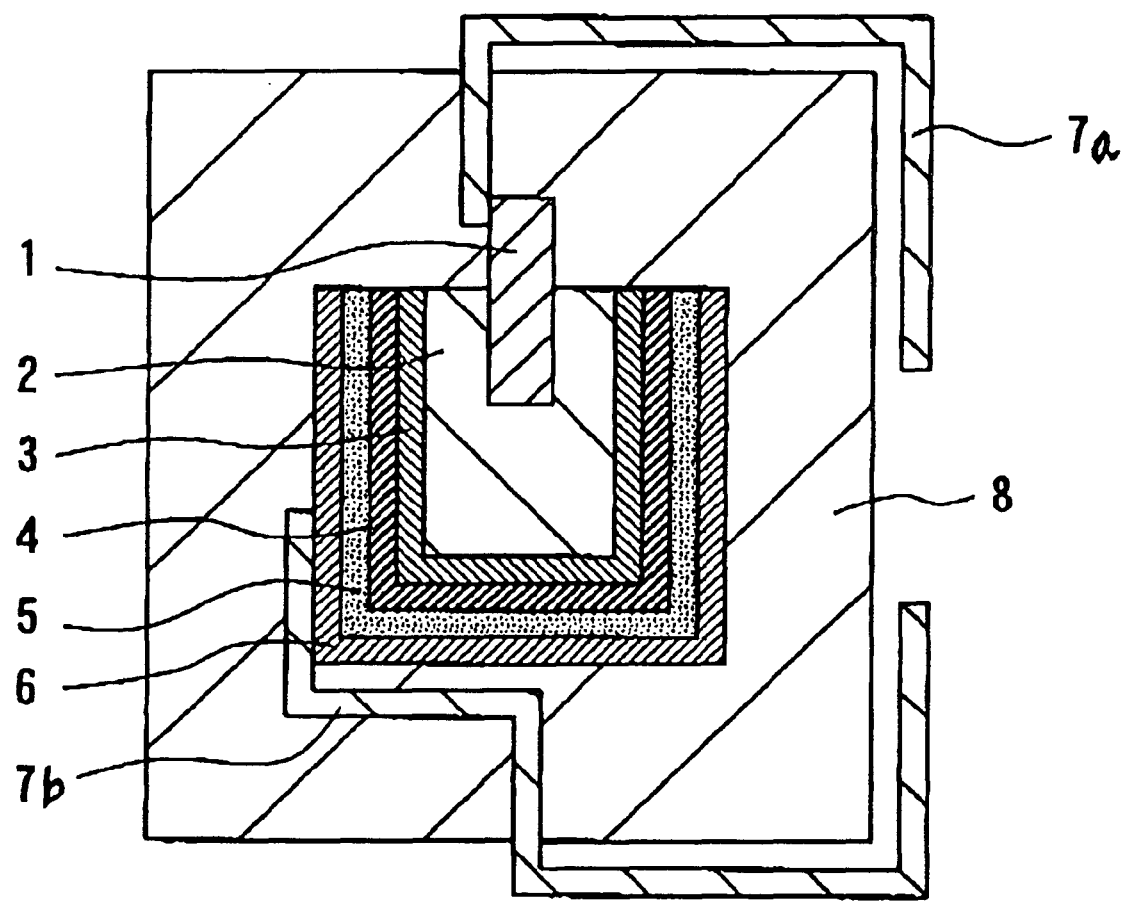

A chip-type solid electrolytic capacitor as shown in FIG. 1D was fabricated in the following way.

First, as shown in FIG. 1A, a porous capacitor body or pellet 2 was made by sintering a powder of tantalum (Ta) having a valve action. The body 2 had an anode wire 1 implanted into the top of the body 2. The body 2 has a cylindrical shape whose diameter and height are both approximately 1 mm.

Next, the porous capacitor body 2 was subjected to an electrochemical anodic oxidation by applying a voltage of 30 V to the body 2 in a water solution of phosphoric acid. Thus, a tantalum pentoxide ($Ta_2O_5$) layer 3 is formed on the surface of the body 2, as shown in FIG. 1A. The top surface of the body 2 is not covered with the tantalum pentoxide layer 3.

Subsequently, the tantalum anode body 2 with the tantalum oxide layer 3 was immersed into a methanol solution of a ferric salt of dodecylbenzenesulfonic acid (DDSA) serving as an oxidizing agent for 30 seconds. The concentration of the DDSA of this methanol solution was 40 wt %.

Then, the immersed body 2 into the methanol solution was dried at a temperature of 23° C. under an atmospheric pressure for 5 minutes.

Further, the dried body or pellet 2 was immersed into a liquid-phase pyrrole serving as a monomer of an organic conducting polymer for 30 seconds. Then, the immersed body 2 into the pyrrole was subjected to chemically-oxidative polymerization of the pyrrole adhered to the oxide layer 3 at a temperature of 23° C. under an atmospheric pressure for 30 minutes. Thus, a polypyrrole layer 4 serving as the layer of the organic conducting polymer was formed on the oxide layer 3, as shown in FIG. 1B.

The body 2 with the polypyrrole layer 4 was then cleaned by methanol and dried at a temperature of 23° C. under an atmospheric pressure.

Following this step, as shown in FIG. 1C, a water solution of phosphoric acid was prepared and supplied into a metallic container 11 with an opened top. Pure water was used as the water of the water solution of phosphoric acid. The concentration of phosphoric acid was then adjusted so that the electric conductivity of this water solution was equal to 150 to 300 $\mu S/cm$. Methanol of 30 to 50 vol % was added to the water solution of phosphoric acid in which the concentration of phosphoric acid was adjusted, thereby producing a reoxidation solution 9. The reference numeral 10 in FIG. 1C denotes a DC battery.

In this step, the mixture of water and alcohol serves as a solvent of the reoxidation solution 9, and phosphoric acid serves as a solute thereof.

Then, to reoxidize the tantalum pentoxide layer 3, the porous capacitor body 2 with the tantalum pentoxide layer 3 and the polypyrrole layer 4 was subjected to an electrochemical anodic oxidation again by applying a voltage of 30 V to the body 2 in the reoxidation solution 9. Thus, the defects existing in the tantalum pentoxide layer 3 were effectively healed.

The above steps of chemically-oxidative polymerization for the polypyrrole layer 4 and reoxidation for the tantalum pentoxide layer 3 were repeated several times until almost all the defects in the tantalum pentoxide layer 3 were healed.

Following this, a graphite layer 5 and a silver paste layer 6 were successively formed on the polypyrrole layer 4 by coating, as shown in FIG. 1D. An inner end of an anode lead 7a was welded to the protruding top end of the anode wire 1. An inner end of a cathode lead 7b was fixed onto the silver paste layer 6 by an electrically-conductive adhesive (not shown).

Finally, the porous capacitor body 2, the tantalum pentoxide layer 3, the polypyrrole layer 4, the graphite layer 5, and the silver paste layer 6, the anode lead 7a, and the cathode lead 7b were encapsulated by an epoxy resin package 8 in such a way that outer parts of the anode and cathode leads 7a and 7b protruded from the package 10 and extended along the surface of the package 8.

Thus, the solid electrolytic capacitor shown in FIG. 1D was fabricated.

To confirm the advantages of the fabrication method according to the first example, 200 solid electrolytic capacitors were practically fabricated according to the first example while changing the concentration of methanol contained in the reoxidation solution 9. Then, the leakage current of these capacitors was measured. The result of this measurement is shown in FIG. 2.

Figure 2:
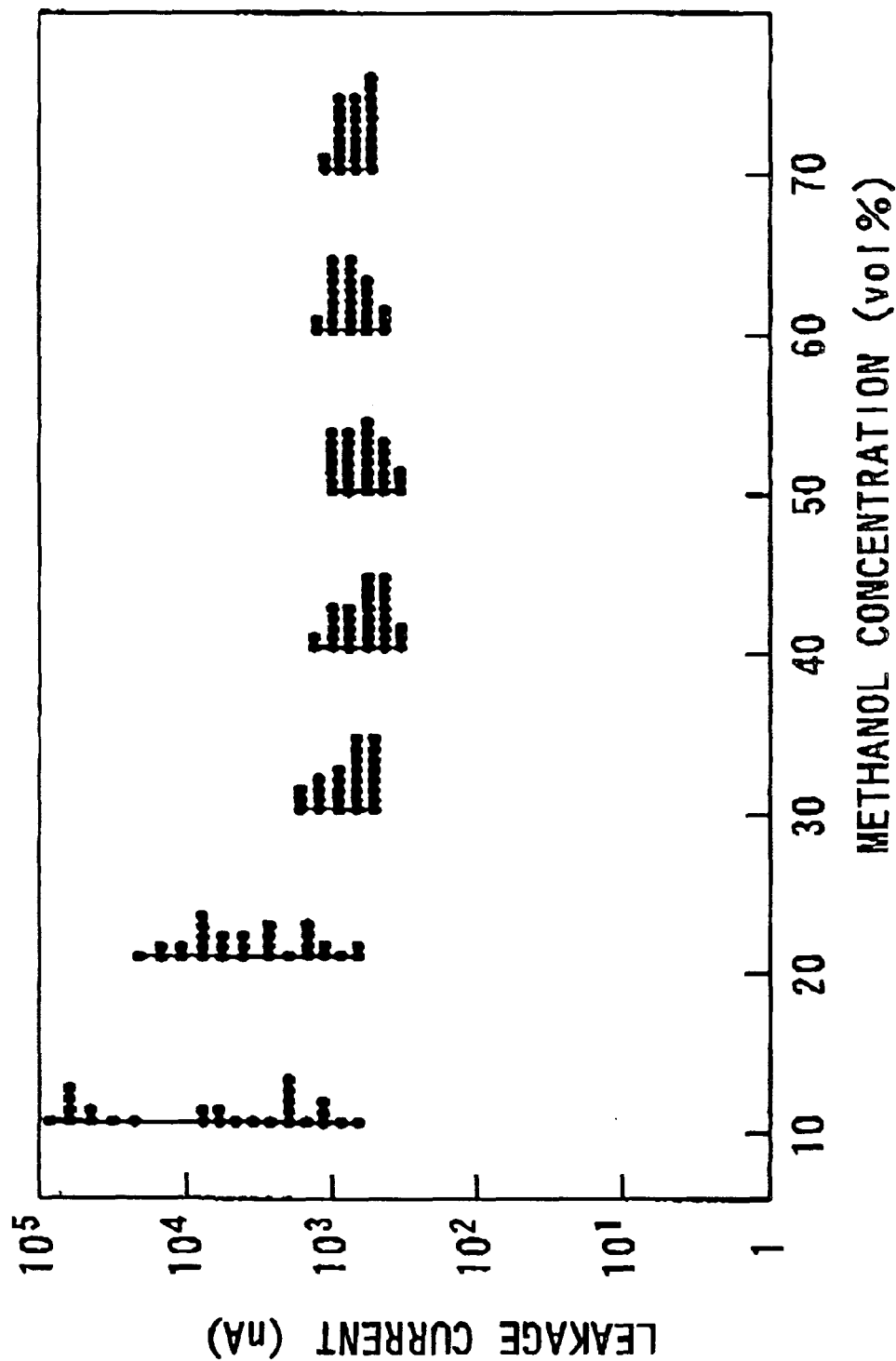
FIG. 2 is a graph showing the distribution of the leakage current of the capacitor fabricated by the method of the present invention with respect to the methanol concentration during the reoxidation process according to the examples of the present invention.

As seen from FIG. 2, it is found that the leakage current clearly decreases when the concentration of methanol in the reoxidation solution 9 is 30 vol % or greater.

Further, the dielectric tangent (tan δ) at a frequency of 100 kHz, and the ESR at the same frequency of the capacitors thus fabricated were measured. The result is shown in FIG. 3 and Table 1, respectively.

TABLE 1

| | METHANOL CONCENTRATION (vol %) | | | | | | |
|---|---|---|---|---|---|---|---|
| | 10 | 20 | 30 | 40 | 50 | 60 | 70 |
| tanδ | 0.070 | 0.064 | 0.062 | 0.060 | 0.061 | 0.060 | 0.060 |

As seen from FIG. 3, it is found that the ESR tends to fluctuate widely when the concentration of methanol in the reoxidation solution 9 is equal to 60 vol % or greater, the reason of which is as follows.

When the concentration of methanol in the reoxidation solution 9 is equal to 60 vol % or greater, water absorbed onto the surface of the tantalum pentoxide layer 3 is insufficient and accordingly, the defects of the tantalum pentoxide layer 3 are not sufficiently healed in the reoxidation process. As a result, a large current tends to flow through the polypyrrole layer 4 during the reoxidation process, thereby causing decomposition of the polypyrrole layer 4.

From the above-described measurement results, it is found that the concentration of methanol in the reoxidation solution 9 is preferably set in the range of 30 vol % to 50 vol %, in which some margin of occurable fluctuation is included.

As seen from Table 1, it is found that the tan δ was approximately equal to the conventional capacitors.

Second to Fourth Examples

In the second to fourth examples, chip-type solid electrolytic capacitors as shown in FIG. 1D were fabricated through the same process steps as those in the first example except that ethanol, butanol, or ethylene glycol was used instead of methanol, respectively.

Although not shown here, substantially the same measurement results as shown in FIGS. 2 and 3 and Table 1 in the first embodiment were obtained in the second to fourth examples, respectively.

Fifth and Sixth Examples

In the fifth and sixth examples, chip-type solid electrolytic capacitors as shown in FIG. 1D were fabricated through the same process steps as those in the first example except that dimethyleketone or diethyleketone was used instead of methanol, respectively.

Although not shown here, substantially the same measurement results as shown in FIGS. 2 and 3 and Table 1 in the first embodiment were obtained in the fifth and sixth examples, respectively.

Seventh to Ninth Examples

In the seventh to ninth examples, chip-type solid electrolytic capacitors as shown in FIG. 1D were fabricated through the same process steps as those in the first example except that polythiophene, polyaniline or polyfuran was used instead of polypyrrole, respectively.

Although not shown here, substantially the same measurement results as shown in FIGS. 2 and 3 and Table 1 in the first embodiment were obtained in the fifth and sixth examples, respectively.

While the preferred examples of the present invention have been described, it is to be understood that modifications will be apparent to those skilled in the art without departing from the spirit of the invention. The scope of the invention, therefore, is to be determined solely by the following claims.

What is claimed is:

1. A fabrication method of a solid electrolytic capacitor, comprising the steps of:

(a) forming a capacitor body by a valve metal; said body serving as an anode of said capacitor;

(b) forming an oxide layer of said valve metal to cover a surface of said capacitor body by anodic oxidation; said oxide layer serving as a dielectric of said capacitor;

(c) forming a layer of an organic conducting polymer on said oxide layer;
   said layer of said organic conducting polymer serving as a solid electrolyte of said capacitor;

(d) immersing said capacitor body with said oxide layer and said layer of said organic conducting polymer in a reoxidation solution;
   said reoxidation solution containing a mixture of water and alcohol or a mixture of water and ketone as a solvent; and (e) applying a voltage to said capacitor body to reoxidize said oxide layer in said reoxidation solution by anodic oxidation, thereby healing defects of said oxide layer;

wherein said water produces hydroxide ions in said reoxidation solution due to dissociation in the step (e);

and wherein said hydroxide ions raises an electric potential barrier against injected electrons in said step (e).

2. The method as claimed in claim 1, wherein a solute of said reoxidation solution is one selected from the group consisting of phosphoric acid, adipic acid, boric acid, acetic acid, and their salts.

3. The method as claimed in claim 1, wherein said mixture contained in said reoxidation solution is a mixture of water and alcohol;
   and wherein said alcohol is one selected from the group consisting of methanol, ethanol, butanol, or ethylene glycol.

4. The method as claimed in claim 3, wherein an amount of said alcohol is in a range from 30 vol % to 50 vol %.

5. The method as claimed in claim 1, wherein said mixture contained in said reoxidation solution is a mixture of water and ketone;
   and wherein said ketone is one selected from the group consisting of dimethylketone and diethylketone.

6. The method as claimed in claim 5, wherein an amount of said ketone is in a range from 30 vol % to 50 vol %.

7. The method as claimed in claim 1, wherein said organic conducting polymer is one selected from the group consisting of polypyrrole, polythiophene, polyaniline or polyfuran.

* * * * *